May 11, 1965     L. E. HOAG     3,182,839
GLASS CONTAINER
Filed March 29, 1963
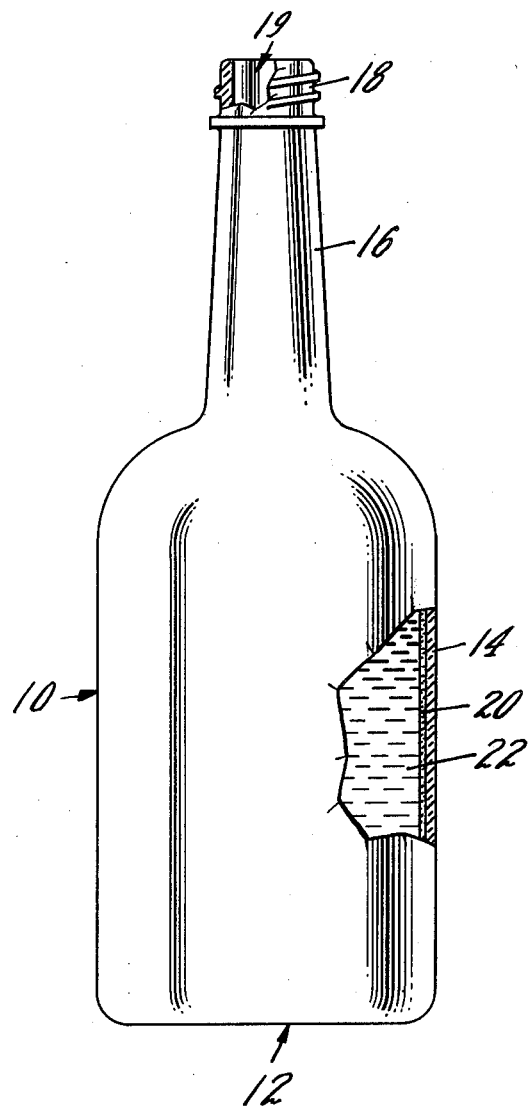
INVENTOR.
LEHMAN EDWARD HOAG
BY Robert P. Auber
George W. Reiber
ATTORNEYS United States Patent Office — 3,182,839, Patented May 11, 1965

3,182,839
GLASS CONTAINER
Lehman Edward Hoag, Cary, Ill., assignor to American Can Company, New York, N.Y., a corporation of New Jersey
Filed Mar. 29, 1963, Ser. No. 269,065
3 Claims. (Cl. 215—1)

The present invention relates to a glass container having a protective lining on the interior thereof; and in particular relates to a glass container having its inside surface substantially completely covered with an adherent, inert, inorganic film or layer.

Although the present invention will be described in relation to a glass bottle for the packaging of distilled alcoholic beverages such as gin, vodka, whiskey, etc., it has utility and applicability to the packaging of any product which tends to attack glass through the sodium oxide content thereof. Many pharmaceuticals fall into this category.

It is known that distilled alcoholic beverages such as gin have a tendency to attack or leech sodium oxide from glass with which they are in contact. Although the amount of material thereby introduced into the beverage is relatively small it does appear to have a deleterious affect on the flavor and/or clarity of the beverage.

The most usual means of alleviating this problem is to produce glass bottles for the packaging of whiskey and the like from a very low sodium oxide content glass. Such glass most usually has a sodium oxide content of less than 15% by weight. The manufacture of such special glass, however, appreciably increases its price owing to the fact that it is more difficult to form than glass of normal sodium oxide content.

It is therefore an object of the instant invention to provide a glass container of high chemical resistance which is simple and inexpensive to manufacture.

Another object is to provide a container of the type described which is resistant to a variety of products which normally tend to attack glass having low chemical resistance.

Another object is to provide a glass container well suited for the packaging of distilled alcoholic beverages and pharmaceuticals.

Numerous other objects and advantages of the invention will be apparent as it is better understood from the following description, which, taken in connection with the accompanying drawing, discloses a preferred embodiment thereof.

The above objects are achieved by lining the interior of a glass container made from any desired glass composition, including that having a high sodium oxide content, with a film or layer of an inorganic polycrystalline material preferably a metal oxide.

Referring to the drawing, the figure is a perspective view of a lined bottle with parts broken away to show the contents thereof.

As a preferred or exemplary embodiment of the invention, the figure shows a glass bottle generally designated 10, including a bottom 12 integral with a tubular body 14, preferably cylindrical, which terminates at its upper end in a neck 16 and a threaded finish 18. The threaded finish 18 is adapted to receive and retain a screw cap closure (not shown) to close the upper dispensing opening or mouth 19 of the bottle 10.

The glass forming the bottle 10 is of the inexpensive variety often used for "one-way" or disposable bottles. Such glass usually has the following composition in percent by weight:

| Ingredient | Range, percent | Typical, percent |
|---|---|---|
| $SiO_2$ | 70–75 | 72 |
| $Al_2O_3$ | 0.5–2.5 | 1 |
| $Na_2O$ | 12–18 | 15 |
| $MgO$ | 0–4 | 3 |
| $CaO$ | 5–14 | 9 |
| $K_2O$ | 0–1 | |

For the purpose of the instant invention no special glass formula is necessary, any desired glass formula being utilizable. Preferred, however, are glass formulas which are conducive to easily formable, relatively inexpensive bottles. Such formulas result in inexpensive, easily formed glass products containing an amount of combined sodium oxide of not less than about 10% by weight.

Completely covering, or at least as completely as possible, the interior surface of the bottle 10 is an adherent film or layer 20 of an oxide of titanium or zirconium in polycrystalline form. The layer 20 is most conveniently formed by introducing into the bottle through its opening 19 a heated gaseous mixture of an anhydrous gas such as dry air or dry nitrogen, and the vapor of a hydrolyzable organic ester of titanium or zirconium. Examples of such esters are tetra isopropyl titanate and tetra-t-butyl zirconate. Particularly preferred as the hydrolyzable metallo organic ester is tetra isopropyl titanate.

After introduction into the bottle 10 and upon contacting the glass, the metallo organic ester vapor undergoes a chemical change, probably hydrolysis, and converts to the metal oxide which forms on and adheres to the interior surface of the glass bottle 10. Once introduced into the bottle this chemical change and oxide deposition take place very rapidly, i.e. from a fraction of a second up to a few seconds. This procedure is continued until a deposit of at least $1 \times 10^{-5}$ and preferably above $2 \times 10^{-5}$ gms. per. sq. in. of surface is formed.

Within the bottle 10 having the polycrystalline oxide layer 20 on the interior surface thereof is a distilled alcoholic beverage 22. This beverage may be gin, vodka, whiskey, and the like. By means of the present invention, a sensitive product, such as the beverage 22, will exhibit a negligible pick-up of undesirable material from the glass of the bottle in which it is stored, even when the storage is prolonged and the glass contains a relatively high content of combined sodium oxide, e.g. 15%.

It is thought that the invention and many of its attendant advantages will be introduced from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:
1. A container to receive and store a sodium oxide sensitive product composed of glass containing a minimum of about 10% by weight of combined sodium oxide and having adhered to and covering substantially the entire inside surface thereof a film of an inorganic oxide of a metal selected from the group consisting of titanium and zirconium as the essential barrier coating between the glass of said container and said product, whereby said product is unaffetced by the relatively high sodium oxide content of said glass.

2. The container set forth in claim 1 wherein said metal is titanium.

3. The container set forth in claim 1 wherein said film is present in an amount of at least $1 \times 10^{-5}$ gm./in.$^2$ of said surface.

References Cited by the Examiner

UNITED STATES PATENTS

| | | | |
|---|---|---|---|
| 2,168,107 | 8/39 | Stevenson et al. | 99—181 |
| 2,538,684 | 1/51 | Gushard et al. | 215—1 |
| 2,622,598 | 12/52 | Rosenblum | 215—1.5 |
| 2,831,594 | 4/58 | Sterges et al. | 215—1 |
| 2,832,701 | 4/58 | Miskel | 215—1.5 |
| 2,917,391 | 12/59 | Canniff et al. | 99—181 |
| 2,918,194 | 12/59 | Quigley et al. | 220—64 |
| 2,925,510 | 2/60 | Morgan | 117—221 |
| 3,004,863 | 10/61 | Gray et al. | 215—1.5 |

FRANKLIN T. GARRETT, *Primary Examiner.*

A. LOUIS MONACELL, GEORGE O. RALSTON,
*Examiners.*